(12) United States Patent
Wilson et al.

(10) Patent No.: US 10,228,005 B2
(45) Date of Patent: Mar. 12, 2019

(54) FASTENER RECEPTACLE STRIP

(71) Applicant: AIRBUS OPERATIONS LIMITED, Bristol (GB)

(72) Inventors: James Wilson, Winscombe (GB); Paul Hadley, Weston-Super-Mare (GB); John Gleave, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 992 days.

(21) Appl. No.: 14/373,108

(22) PCT Filed: Jan. 11, 2013

(86) PCT No.: PCT/GB2013/050049
§ 371 (c)(1),
(2) Date: Jul. 18, 2014

(87) PCT Pub. No.: WO2013/108013
PCT Pub. Date: Jul. 25, 2013

(65) Prior Publication Data
US 2015/0030380 A1    Jan. 29, 2015

(30) Foreign Application Priority Data

Jan. 19, 2012   (GB) .................................. 1200912.2

(51) Int. Cl.
*F16B 5/02* (2006.01)
*B64C 1/12* (2006.01)
(Continued)

(52) U.S. Cl.
CPC ................ *F16B 11/00* (2013.01); *B64C 1/12* (2013.01); *B64C 3/14* (2013.01); *F16B 5/02* (2013.01);
(Continued)

(58) Field of Classification Search
CPC ..... B64C 3/14; B64C 1/12; B64C 2001/0072; B64C 1/065; B64C 1/069; B64C 3/185;
(Continued)

(56) References Cited

U.S. PATENT DOCUMENTS 3,008,554 A * 11/1961 Hodgson ................... B64C 1/06
403/21
4,888,451 A * 12/1989 Toni ....................... B64D 45/02
174/94 R
(Continued)

FOREIGN PATENT DOCUMENTS

| EP | 2368699 A1 | 9/2011 |
| WO | 2009/038925 A1 | 3/2009 |
| WO | 2009/118548 A2 | 10/2009 |

OTHER PUBLICATIONS

International Search Report dated Apr. 22, 2013 in International Application No. PCT/GB2013/050049, filed Jan. 11, 2013.
(Continued)

*Primary Examiner* — Ryan D Kwiecinski
(74) *Attorney, Agent, or Firm* — Nixon & Vanderhye P.C.

(57) ABSTRACT

A structural assembly comprising a first component having a ramped surface, and a fastener assembly for fastening the first component to a second component, the fastener assembly including a receptacle strip of resiliently deformable material attached to the ramped surface of the first component so as to assume the contour of the ramped surface, and a plurality of fastener receptacles attached to the receptacle strip for receiving respective fasteners. Also, a method of fastening a first component to a second component using the fastener assembly.

19 Claims, 3 Drawing Sheets

(51) Int. Cl.
    *B64C 3/14*      (2006.01)
    *F16B 11/00*     (2006.01)
(52) U.S. Cl.
    CPC ........ *F16B 11/006* (2013.01); *Y10T 29/49947* (2015.01); *Y10T 403/472* (2015.01)
(58) Field of Classification Search
    CPC ..... B64C 3/20; B64C 3/26; F16B 5/02; F16B 5/0208; F16B 5/12; F16B 5/123; F16B 5/121
    USPC .................... 52/416, 417, 462, 463; 403/286
    See application file for complete search history.

(56) References Cited

U.S. PATENT DOCUMENTS

| | | | | |
|---|---|---|---|---|
| 5,897,739 A * | 4/1999 | Forster | ................. | B29C 70/342 156/285 |
| 7,963,081 B2 * | 6/2011 | Pierson | ................. | E04D 3/3603 52/394 |
| 8,707,647 B2 * | 4/2014 | Crego | .................... | E04D 3/365 52/394 |
| 9,187,907 B2 * | 11/2015 | Schraga | .................. | E04F 13/04 |
| 2008/0258008 A1 * | 10/2008 | Cooper | .................... | B64C 1/12 244/131 |
| 2009/0229209 A1 * | 9/2009 | Crego | .................... | E04D 3/365 52/462 |
| 2010/0065688 A1 * | 3/2010 | Wood | .................... | B29C 65/562 244/131 |
| 2010/0077690 A1 * | 4/2010 | Durand | .................... | B64C 1/12 52/578 |
| 2010/0308170 A1 * | 12/2010 | Hadley | .................... | B64C 1/12 244/131 |
| 2011/0233338 A1 * | 9/2011 | Stewart | .................... | B64C 3/28 244/131 |
| 2012/0006942 A1 * | 1/2012 | Coulter | .................... | B64C 3/28 244/131 |
| 2013/0082143 A1 * | 4/2013 | Storozuk | ............... | B64C 1/1446 244/129.5 |
| 2013/0084422 A1 * | 4/2013 | Thable | .................... | B64C 1/069 428/137 |
| 2017/0327203 A1 * | 11/2017 | Holmes | .................... | B64C 3/26 |

OTHER PUBLICATIONS

Written Opinion dated Apr. 22, 2013 in International Application No. PCT/GB2013/050049, filed Jan. 11, 2013.
GB1200912.2 Search Report. dated May 17, 2012.

* cited by examiner

FASTENER RECEPTACLE STRIP

RELATED APPLICATIONS

The present application is a National Phase of International Application Number PCT/GB2013/050049, filed Jan. 11, 2013, which claims priority from Great Britain Application No. 1200912.2, filed Jan. 19, 2012.

FIELD OF THE INVENTION

The invention relates to a structural assembly, and more particularly to a fastener assembly for fastening a first component to a second component.

BACKGROUND OF THE INVENTION

It is known to attach a detachable panel to an aircraft structure using a plurality of fasteners. Countersunk fasteners are frequently used in combination with an anchor nut (fastener receptacle). The anchor nuts are attached to an interior surface of the aircraft structure and the respective countersunk fasteners pass through the panel and the aircraft structure with the countersunk fastener heads substantially flush with the outer aerodynamic surface of the panel.

To reduce parts count it is known to provide a plurality of the anchor nuts as a subassembly arranged on a planar receptacle strip that can be attached to the aircraft structure, e.g. by riveting. On traditional metallic aircraft structures the use of a metallic receptacle strip riveted to the aircraft structure is generally satisfactory.

With the move to greater use of composite materials in aircraft structures, several shortcomings in the use of the metallic receptacle strip have been identified. In particular it is sometimes desirable to provide thickness variation across laminate composite structures (by dropping plies) to better match local load requirements, which results in ramps on the inner surface of the structure generally not found in traditional metallic constructions.

SUMMARY OF THE INVENTION

A first aspect of the invention provides a structural assembly comprising a first component having a ramped surface, and a fastener assembly for fastening the first component to a second component, the fastener assembly including a receptacle strip of resiliently deformable material attached to the ramped surface of the first component so as to assume the contour of the ramped surface, and a plurality of fastener receptacles attached to the receptacle strip for receiving respective fasteners.

A further aspect of the invention provides a method of fastening a first component to a second component, the method comprising: providing a first component having a ramped surface; providing a fastener assembly including a receptacle strip of resiliently deformable material and a plurality of fastener receptacles attached to the receptacle strip; attaching the receptacle strip to the ramped surface of the first component such that it assumes the contour of the ramped surface; and installing fasteners through the first and second components and into the respective fastener receptacles so as to fasten the first component to the second component.

The invention is advantageous in that the receptacle strip of resiliently deformable material can be supplied as a stock part adapted to conform to a variety of contours across different components. This reduces parts count, assembly time and cost.

The first component may include composite material, preferably carbon fibre reinforced polymer. The receptacle strip may include silica glass material. Silica glass is well matched to carbon fibre reinforced polymer material due to their similar thermal and similar stiffness material properties. Compared with traditional metallic materials, utilising glass the receptacle strip material reduces weight and also reduces electro-magnetic issues associated with static discharge from systems and lightning strikes.

Alternatively, the first component may include metallic material and/or the receptacle strip may include a rubber or other elastomeric material.

The ramped surface of the first component may be associated with a variation in structural thickness across the first component. The first component may be a laminate, and the ramped surface may be formed by dropping plies.

The receptacle strip may be bonded to the first component. This helps ensure that the strip remains fixed with respect to the first component even when the first and second components are disassembled. The resiliently deformable strip may be temporarily slave bolted to force the strip to deformed to the contours of the first component whilst the adhesive bond cures/sets. A low tack adhesive may be used. The low tack adhesive is particularly beneficial when used to attach the strip directly to a laminate composite component, as the strip can still be removed (if required) without causing ply damage.

The fastener receptacles may be riveted to the receptacle strip.

The fastener assembly may include removable fasteners. The fasteners are preferably quick release fasteners.

The structural assembly may further comprise the second component fastened to the first component by installing the fasteners through the first and second components and into the respective fastener receptacles.

Abutting surfaces of the first and second components may be substantially planar.

The first component may have a joggle adjacent the fastener assembly. The joggle may include a ramp in a direction different to that of the ramped surface so as to provide a compound ramped surface.

The first component and/or the second component may be a panel. In one embodiment, the first component is an aircraft wing cover and the second component is a removable aircraft wing panel.

The receptacle strip and the fastener receptacles may be provided as a subassembly with the fastener receptacles pre-installed on the receptacle strip.

The receptacle strip may be initially substantially planar, prior to installation on the ramped surface.

DETAILED DESCRIPTION OF EMBODIMENT(S)

Figure 1:
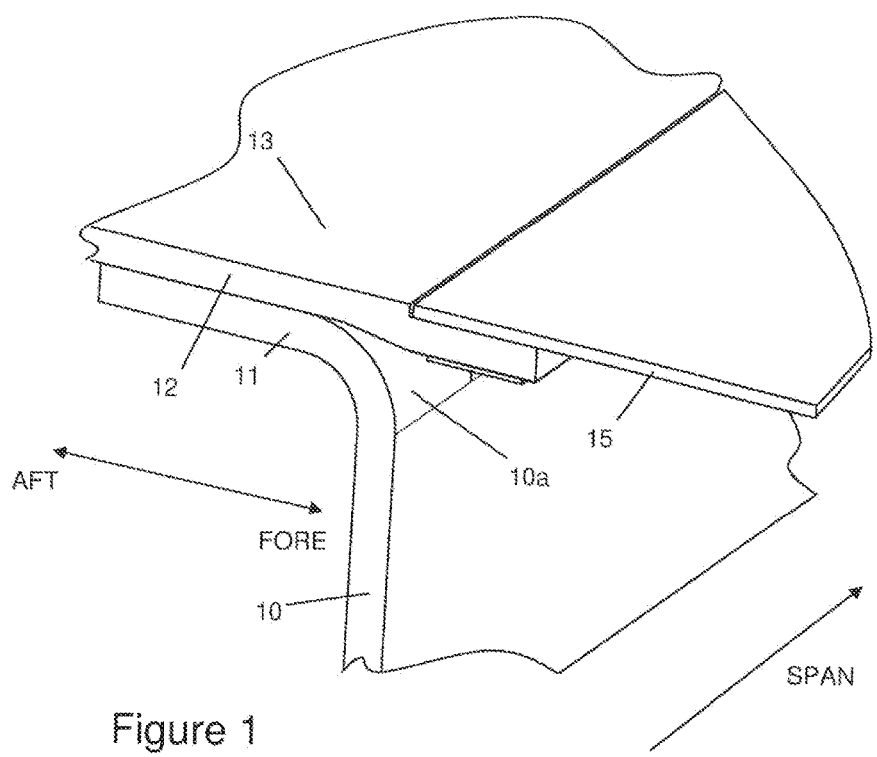
FIG. 1 illustrates a perspective view of the front spar of an aircraft wing.

A front spar of an aircraft wing is shown in FIG. 1. The spar comprises a web 10, an upper flange 11 and a lower flange (not shown). The spar has a radius portion 10a where the web 10 meets the flange 11. A laminar composite cover (skin) 12 is attached to the upper flange 11 and extends all of the spar to form the upper boundary of the wing box (the primary structural element of the wing). The cover 12 also overhangs the front of the spar slightly as shown in FIG. 1.

Figure 3:
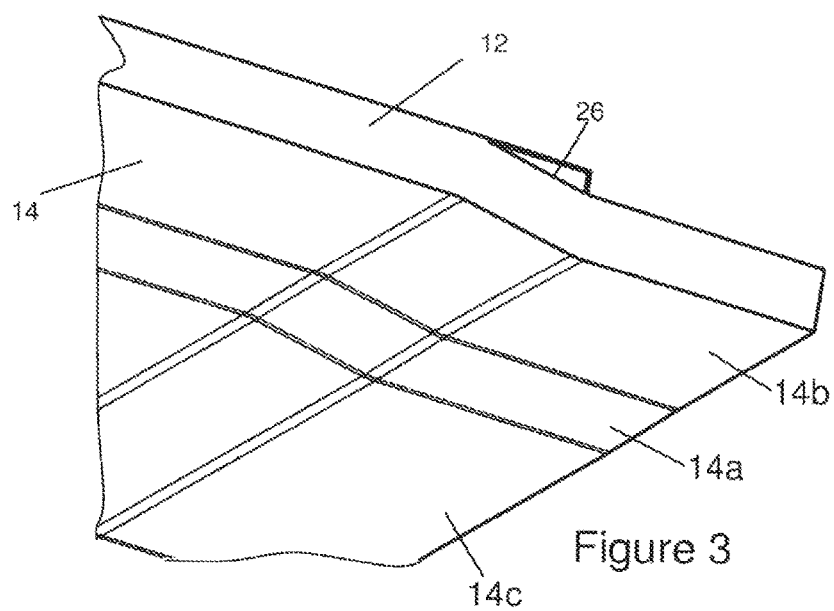
FIG. 3 illustrates a perspective view of the underside or the wing cover showing the spanwise ramp in the interior surface and the chordwise joggle.

The cover 12 has an external side 13 shown in FIG. 1 and an internal side 14 shown in FIG. 3. The cover 12 includes an edge protector 22 pre-formed with a wedge shape which tapers gradually from a relatively thick end to a relatively thin edge, and a plurality of "prepreg" plies, preferably of carbon fibre pre-impregnated with an epoxy resin matrix. The edge protector and the pre-preg plies are preferably co-cured.

The stack of plies in the cover 12 forms a Z-shaped so-called "joggle" profile in the chordwise wing direction (i.e. parallel with the aircraft fuselage centreline) with a ramp adjacent the edge protector 22. The joggle extends across the full stack thickness, so that each one of the layers in the stack is shaped to form a joggle, each joggle comprising a first portion, a second portion where the laser extends substantially parallel with the first portion, and a ramp between the first and second portions where the layer extends at an angle to the first and second portions.

The stack of plies in the cover 12 also forms a ramped internal side 14, as best shown in FIG. 3. The shape of the external side 13 of the cover (known as the "outer mould line" or OML) is precisely controlled since it engages a mould tool during the cover forming process and ultimately forms part of the aerodynamic surface of the wing. The shape of the internal side 14 of the cover is ramped to as to accommodate changes in panel thickness in the spanwise direction (i.e. perpendicular to the aircraft fuselage centreline).

FIG. 3 shows the internal side 14 of the cover 12 which includes a spanwise ramped region 14a between adjacent regions 14b, 14c. The ramped region 14a corresponds to a region of varying thickness in the stack of plies forming the cover 12, and the regions 14b, 14c correspond to regions of constant thickness in the cover 12. In the ramped region 14a the thickness of the stack of plies in the cover changes, e.g. by dropping off plies. The spanwise ramps provide structural variation across the cover, e.g. for varying the strength of the cover at particular locations.

The ramped surface at the internal side 14 of the cover 12 is characterised by at least two regions inclined with respect to each other. The ramped region 14a of the internal side 14 of the cover is inclined with respect to the adjacent regions 14b, 14c. In this particular example, the regions 14b, 14c correspond to constant thickness regions of the cover and so these regions of the internal side of the cover are each substantially parallel with the external side 13 of the cover 12. By contrast, the region 14a corresponds to a varying thickness region of the cover and so is also inclined with respect to the external side of the cover. The external side 13 of the cover is substantially planar, and is shaped to match the desired profile of the wing. In this particular embodiment, the spanwise ramp traverses the chordwise joggle, creating a compound ramped surface. In other embodiments, the cover may have no joggle creating a simple spanwise ramp.

Figure 4:
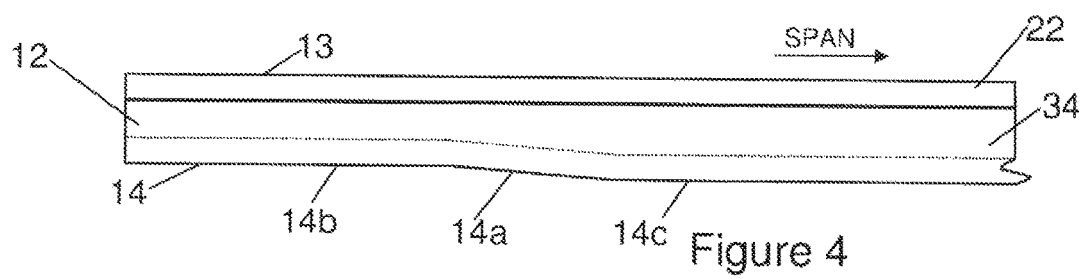
FIG. 4 illustrates an end view of the wing cover of FIG. 3 showing the spanwise ramp in the interior surface.

FIG. 4 illustrates an end view looking aft on the end 34 of the cover 12, showing the spanwise ramp on the internal side 14.

Figure 2:
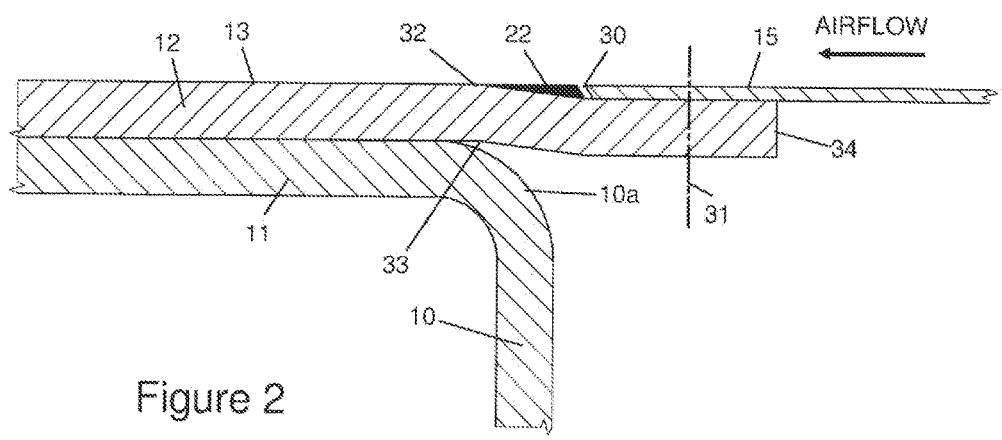
FIG. 2 illustrates a cross sectional side view of the joint between the wing cover and the leading-edge panel in the wing of FIG. 1 (with the fastener assembly removed for clarity)

After the cover 12 has been bolted to the spar, it is joined to a leading edge panel 15 by as lap joint shown most clearly in the cross-sectional view of FIG. 2. The panel 15 may or may not be formed from a similar composite material. In one example, the panel 15 includes a predominantly sandwich core construction.

The internal side of the panel 15 is partially overlapped with the external side 13 of the cover 12 as shown in FIG. 2. The edge protector 22 and the external sides of the panel 15 and the cover 12 together form a substantially continuous external aerodynamic surface which is exposed to an airflow as shown. A fastener assembly 40 (not shown in FIG. 2) is used along a line 31 through the cover 12 and panel 15 where they overlap to joint the cover 12 and the panel 15. Fasteners of the fastener assembly can be removed to enable the joint to be disassembled for inspection or repair purposes. The fastener assembly 40 will be described in detail below.

The edge protector 22 is positioned between the joggle and the trailing edge 30 of the panel 15, and protects the edge 32 at the downstream "top" of the joggle ramp 26 from erosion by particles carried by the airflow (which travels in the direction indicated in FIG. 2). The gap between the edge protector 22 and the trailing edge 30 of the panel 15 is filled using Aero filler (not shown) at final assembly.

On the internal side of the cover 12, the "top" 33 of the joggle ramp is positioned as close as possible to the spar 11, so the joggle ramp partially overlaps with the radius portion 10a of the spar (top and bottom being defined in this case relative to the orientation shown in FIG. 2). This enables the edge 34 of the cover 12 to be positioned relatively close to the spar.

Alternatively, the edge protector may be pre-attached to the panel 15 instead of the cover 12. This creates a replaceable item if damaged or worn, with no impact on the primary structure.

Figure 5:
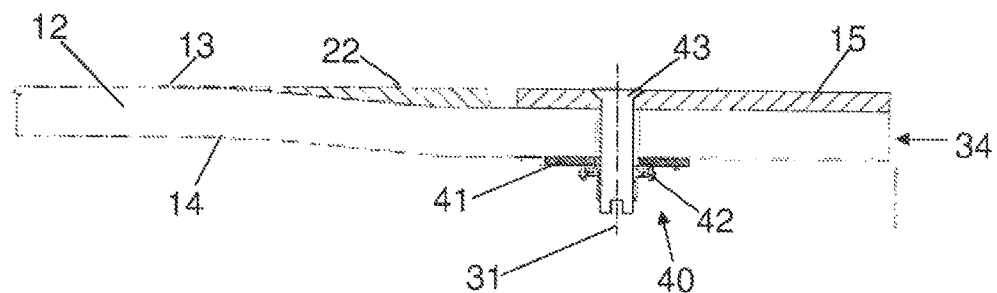
FIG. 5 illustrates a cross sectional side view of the joint between the wing cover the leading-edge panel in the wing of FIG. 1 with the fastener assembly installed.

The fastener assembly 40 will now be described in detail with reference to FIGS. 5 to 7. The fastener assembly includes a receptacle strip 41 of resiliently deformable material attached to the ramped surface on the internal side 14 of the cover 12. The receptacle strip 41 extends in the chordwise direction and assumes the contour of the ramped surface.

A plurality of fastener receptacles 42 are attached to the receptacle strip 41 spaced along the length of the strip. Each fastener receptacle 42 is adapted to receive respective fastener 43 so as to provide a row of fasteners along the line 31 through the cover 12 and panel 15 where they overlap. The fasteners 43 are adapted to be removable from their respective fastener receptacles 42 for disassembly of the joint between the panel 15 and the cover 12 for inspection or repair purposes.

Figure 6:
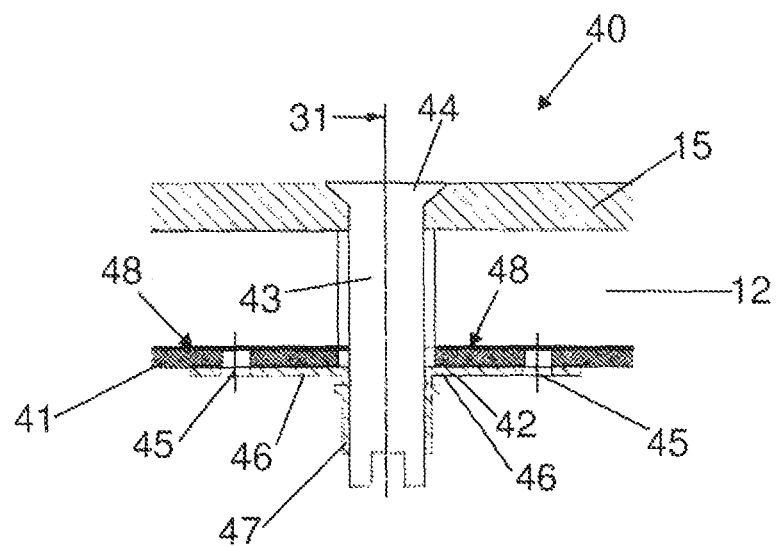
FIG. 6 illustrates a detailed cross sectional view of the installed fastener assembly.
Figure 7:
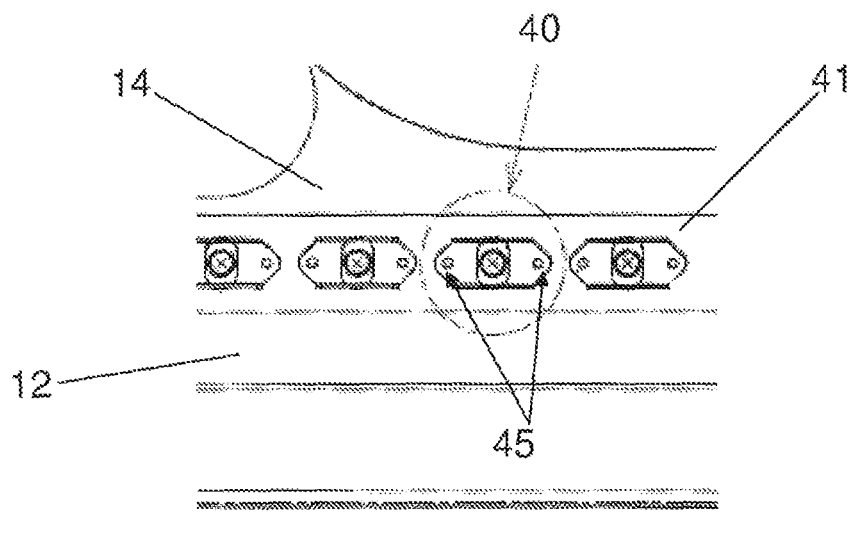
FIG. 7 illustrates a plan view of the underside of the installed fastener assembly.

FIG. 6 illustrates one fastener of the fastener assembly 40 in detail. The fastener 43 has as counter sunk head 44 arranged substantially flush with the external surface of the panel 15. The fasteners 43 are quick release fasteners for ready disassembly. The fastener receptacles 42 are anchor nuts of conventional type and includes an attachment flange 40 and an upstanding turret 47. The anchor nuts are well known to those skilled in the art and so a detailed description will not be repeated here. The fastener receptacles 42 are pre-attached to the receptacle strip 41 prior to attachment to the cover 12. In this embodiment, the fastener receptacles 42 are each riveted to the receptacle strip 41 at rivet locations 45, as shown in FIG. 7.

The receptacle strip 41 has a thickness of approximately 1-2 mm and comprises silica glass. The silica glass has similar thermal characteristic properties to the carbon fibre reinforced polymer material of the cover 12 and so good thermal compatibility between these parts is ensured. The silica glass material is sufficiently resiliently deformable so as to conform to the contour of the ramped surface of the internal side 14 of the cover 12. Alternatively, the receptacle strip 41 may include other materials such as rubber, for example. Use of a rubber receptacle strip may be desirable, particularly where materials other than carbon fibre reinforced polymer is used in the panel 12. For example, a rubber receptacle strip may be used with a metallic cover.

The glass receptacle strip 41 is bonded to the carbon fibre reinforced polymer cover 12, preferably with a low tack adhesive 48 so as to enable the receptacle strip 41 to be removed without damaging the plies of the laminate composite cover 12.

A method of installing the fastener assembly 40 will now be described in detail. The receptacle strip 41 having the pre attached fastener receptacles 42 is bonded to the internal side 14 of the cover 12 along the fastener line 31. The receptacle strip 41 is provided as a stock component and is cut to size according to the width of the cover 12. In this way, the receptacle strip 41 traverses all of the ramps and contours of the internal side 14 of the cover 12 along the fastener line 31. The receptacle strip 41 is retained against the cover 12 with light pressure until the adhesive used to bond the receptacle strip 41 to the cover 12 has set or cured. Fastener holes are drilled in the panel 15 and the cover 12 aligned with the fastener receptacles 42 and the counter sunk head fasteners 43 are installed through the fastener holes and securely received in the fastener receptacles 42 so as to complete the fastener assembly 40.

Although the invention has been described above with reference to one or more preferred embodiments, it will be appreciated that various changes or modifications may be made without departing from the scope of the invention as defined in the appended claims.

The invention claimed is:

1. A structural assembly comprising a first component, a second component, and a fastener assembly fastening the first component to the second component, the first component having a ramped surface formed by at least two regions inclined with respect to each other along a first direction, the ramped surface corresponds to a variation in structural thickness in the first component in the first direction, the fastener assembly including a receptacle strip of resiliently deformable material extending in the first direction, wherein the receptacle strip is bonded to the ramped surface of the first component so as to conform to the contour of the ramped surface, and a plurality of fasteners passing through the first and second components and into a plurality of respective fastener receptacles disposed along the first direction and attached on the receptacle strip.

2. A structural assembly according to claim 1, wherein the first component includes composite material.

3. A structural assembly according to claim 1, wherein the receptacle strip includes silica glass material.

4. A structural assembly according to claim 1, wherein the materials of the first component and the receptacle strip have substantially the same thermal properties.

5. A structural assembly according to claim 1, wherein the materials of the first component and the receptacle strip have substantially the same stiffness properties.

6. A structural assembly according to claim 1, wherein the first component is a laminate, and the ramped surface is formed by dropping plies.

7. A structural assembly according to claim 1, wherein the fastener receptacles are riveted to the receptacle strip.

8. A structural assembly according to claim 1, wherein the fastener assembly includes removable fasteners.

9. A structural assembly according to claim 1, wherein the first and second components overlap in abutment and have respective abutting surfaces, the abutting surface of the first component is opposite the ramped surface of the first component.

10. A structural assembly according to claim 9, wherein abutting surfaces of the first and second components are substantially planar.

11. A structural assembly according to claim 1, wherein the first component has a joggle adjacent the fastener assembly.

12. A structural assembly according to claim 1, wherein the first component or the second component is a panel.

13. A structural assembly according to claim 1, wherein the first component is an aircraft wing cover and the second component is a removable aircraft wing panel.

14. A structural assembly according to claim 1, wherein the first component includes carbon fibre reinforced polymer.

15. A structural assembly, comprising:
a first component, a second component, and a fastener assembly fastening the first component to the second component,
the first component having a ramped surface formed by at least two regions inclined with respect to each other along a first direction,
the ramped surface corresponds to a variation in structural thickness in the first component in the first direction,
the fastener assembly including a receptacle strip of resiliently deformable material extending in the first direction and attached to the ramped surface of the first component so as to assume the contour of the ramped surface, and
a plurality of fasteners passing through the first and second components and into a plurality of respective fastener receptacles disposed along the first direction and attached on the receptacle strip, wherein the receptacle strip is bonded to the first component using a low tack adhesive.

16. A method of fastening a first component to a second component, the method comprising:
providing a first component having a ramped surface formed by at least two regions inclined with respect to each other along a first direction, the ramped surface corresponds to a variation in structural thickness in the first component in the first direction;
providing a fastener assembly including a receptacle strip of resiliently deformable material and a plurality of fastener receptacles disposed along the first direction and attached on the receptacle strip;
bonding the receptacle strip to the ramped surface of the first component such that it extends in the first direction and conforms to the contour of the ramped surface; and installing fasteners through the first and second components and into the respective fastener receptacles so as to fasten the first component to the second component.

17. A method according to claim 16, wherein the receptacle strip is bonded to the first component with an adhesive and retained against the ramped surface until the adhesive has cured.

18. A method according to claim 16, wherein the receptacle strip and the fastener receptacles are provided as a subassembly with the fastener receptacles pre-installed on the receptacle strip.

19. A method according to claim 16, wherein the receptacle strip is initially substantially planar, prior to installation on the ramped surface.

* * * * *